(12) United States Patent
Huang et al.

(10) Patent No.: US 7,609,795 B2
(45) Date of Patent: Oct. 27, 2009

(54) INTERPOLATION MODULE, INTERPOLATOR AND METHODS CAPABLE OF RECOVERING TIMING IN A TIMING RECOVERY APPARATUS

(75) Inventors: Po-Chun Huang, Taipei (TW); Chia-Hsin Lin, Taipei (TW)

(73) Assignee: Via Technologies, Inc., Taipei (TW)

( * ) Notice: Subject to any disclaimer, the term of this patent is extended or adjusted under 35 U.S.C. 154(b) by 785 days.

(21) Appl. No.: 11/242,695

(22) Filed: Oct. 4, 2005

(65) Prior Publication Data

US 2007/0076806 A1  Apr. 5, 2007

(51) Int. Cl.
*H04L 7/00* (2006.01)
(52) U.S. Cl. .................. 375/355; 375/260; 375/354; 375/259
(58) Field of Classification Search .................. 375/260, 375/355
See application file for complete search history.

(56) References Cited

U.S. PATENT DOCUMENTS

| | | | | |
|---|---|---|---|---|
| 5,978,420 A | * | 11/1999 | Koslov et al. | 375/295 |
| 6,545,532 B1 | * | 4/2003 | Maalej et al. | 329/304 |
| 6,763,072 B1 | * | 7/2004 | Matsui et al. | 375/260 |
| 7,088,672 B2 | * | 8/2006 | Kim | 370/208 |
| 7,203,718 B1 | * | 4/2007 | Fu et al. | 708/622 |
| 2002/0097669 A1 | * | 7/2002 | Kim | 370/208 |
| 2003/0137765 A1 | * | 7/2003 | Yamazaki et al. | 360/39 |
| 2004/0213337 A1 | * | 10/2004 | Li et al. | 375/222 |
| 2007/0009061 A1 | * | 1/2007 | Kaku et al. | 375/295 |

OTHER PUBLICATIONS

"Interpolation in Digital Modems—Part I: Fundamentals" Gardner; 1993.
"Interpolation in Digital Modems—Part II: Implementation and Performance" Erup et al.; 1993.

* cited by examiner

*Primary Examiner*—Shuwang Liu
*Assistant Examiner*—Kenneth Lam
(74) *Attorney, Agent, or Firm*—Thomas, Kayden, Horstemeyer & Risley (57) ABSTRACT

The invention relates to an interpolation module, an interpolator, and methods capable of recovering timing, and in particular, to an interpolation module, an interpolator, and methods capable of recovering timing in a timing recovery apparatus. An interpolation module capable of recovering timing in a timing recovery apparatus comprises a first symbol inverse unit for shifting phase of a digital input signal by 180 degrees to generate a first inverted signal comprising a plurality of sampling values; an interpolator coupled to the first symbol inverse unit for interpolating the plurality of sampling values according to a fractional interval to generate an interpolated signal, which comprises a plurality of interpolants; and a second symbol inverse unit coupled to the interpolator for shifting phase of the interpolated signal by 180 degrees to output a second inverted signal.

6 Claims, 7 Drawing Sheets

INTERPOLATION MODULE, INTERPOLATOR AND METHODS CAPABLE OF RECOVERING TIMING IN A TIMING RECOVERY APPARATUS

BACKGROUND

The invention relates to an interpolation module, an interpolator, and methods capable of recovering timing, and in particular, to an interpolation module, an interpolator, and methods capable of recovering timing in a timing recovery apparatus of a receiver (e.g. orthogonal frequency division multiplexing receiver).

Orthogonal Frequency Division Multiplexing (OFDM) is an efficient multi-channel modulation technology utilizing Fast Fourier Transform.(FFT) and Inverse Fast Fourier Transform (IFFT) to modulate and demodulate signals respectively with a plurality of orthogonal sub carriers. In an OFDM communication system, timing between an OFDM transmitter and an OFDM receiver is asynchronous. In order to recover timing, a timing recovery apparatus is utilized in the OFDM receiver.

Figure 1:
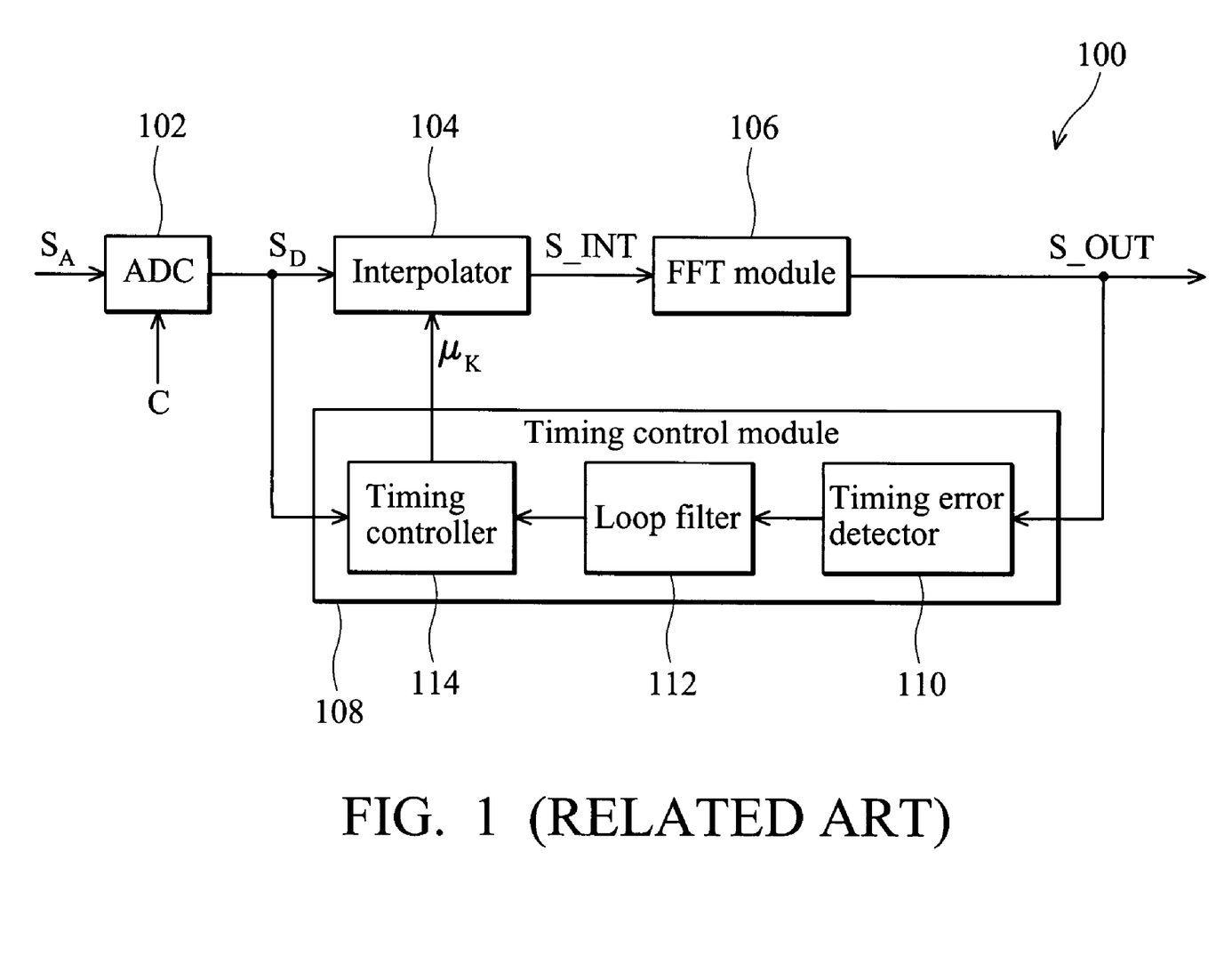
FIG. 1 shows a block diagram illustrating a related art timing recovery apparatus.

FIG. 1 shows a block diagram illustrating a related art timing recovery apparatus 100. The timing recovery apparatus 100 comprises an analog-to-digital converter (ADC) 102, an interpolator 104, a FFT module 106, and a timing control module 108. The ADC 102 utilizes a reference sampling clock c, which is fixed and can be generated from a local oscillator (e.g. a PLL), to convert an analog input signal $S_A$ to a digital input signal $S_D$ that comprises a plurality of sampling values. Because the functionality and operation of the ADC 102 is known to those skilled in the art, further discussion of its operation is omitted for the sake of brevity. The interpolator 104 coupled to the ADC 102 interpolates the plurality of sampling values according to a fractional interval $\mu_k$, which represents a duration of a timing error corresponding to a sample time k, to generate an interpolated signal S_INT that comprises a plurality of interpolants. A detailed description of the interpolator 104 is provided later. The FFT module 106 coupled to the interpolator 104 finally demodulates the interpolated signal S_INT to output a digital output signal S_OUT. The timing control module 108 coupled to the FFT module 106, the ADC 102, and the interpolator 104, generates the fractional interval $\mu_k$ to the interpolator 104 according to the digital output signal S_OUT and the digital input signal $S_D$. The timing control module 108, acting like a related art digital phase locked loop (DPLL), comprises a timing error detector 110, a loop filter 112, and a timing controller 114. Since the timing control module 108 is known to those skilled in the art, further discussion is omitted for the sake of brevity. The operation of the interpolator 104 is further detailed in the following.

Figure 2:
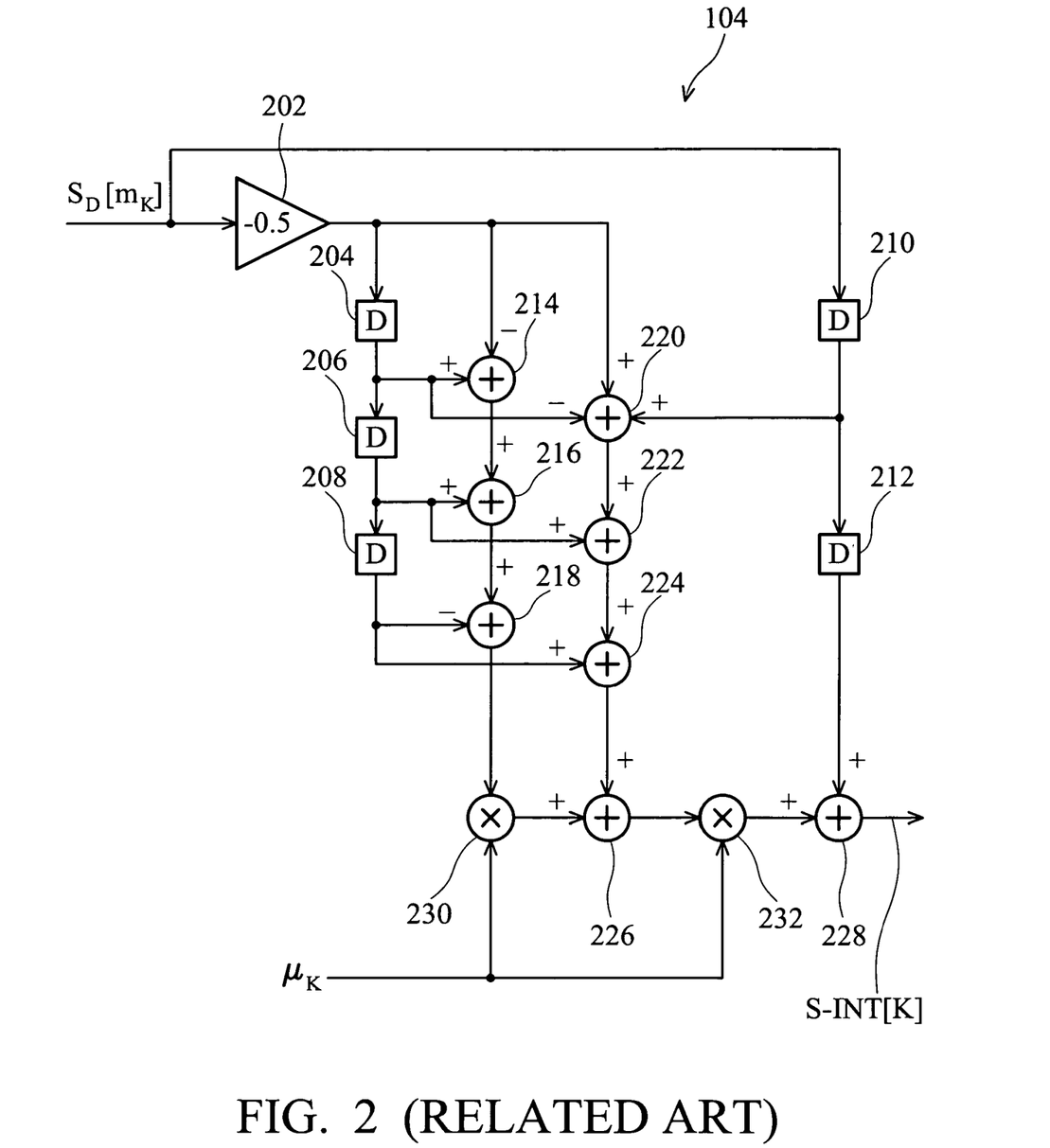
FIG. 2 is a circuit diagram illustrating the operation of the interpolator shown in FIG. 1.
Figure 3:
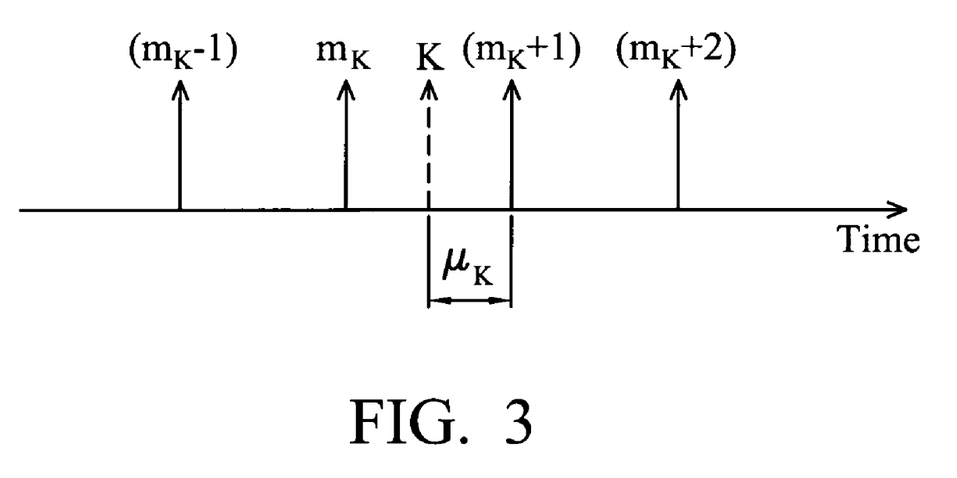
FIG. 3 is a timing diagram showing a sample timing relation of the interpolator shown in FIG. 2.

Please refer to FIG. 2 and FIG. 3 at the same time. FIG. 2 is a circuit diagram illustrating the operation of the interpolator 104 shown in FIG. 1. FIG. 3 is a timing diagram showing a sample timing relation of the interpolator 104 shown in FIG. 2. The interpolator 104 is a piecewise-parabolic Farrow interpolator comprising delay modules 204, 206, 208, 210 and 212, a constant scale module 202, adders 214, 216, 218, 220, 222, 224, 226 and 228, and multiplers 230 and 232. The interpolator 104 utilizes the above-mentioned elements to interpolate the plurality of sampling values according to the fractional interval $\mu_k$ to generate the interpolated signal S_INT. The interpolated signal S_INT comprises a plurality of interpolants. One interpolant is shown below (please refer to FIG. 3 at the same time):

$S\_INT[k]=S_D[m_k+2](-\alpha\mu_k+\alpha\mu^2_k)+S_D[m_k+1]((\alpha+1)\mu_k-\alpha\mu^2_k)+S_D[m_k](1-\alpha\mu_k-\alpha\mu^2_k)+S_D[m_k-1](-\alpha\mu_k+\alpha\mu^2_k)$ Formula (1)

$\alpha$ is a predetermined parameter equal to 0.5, k is a sample time, and $m_k$ is another sample time corresponding to the sample time k. The predetermined parameter $\alpha$ equal to 0.5 simplifies the multiplication and reduces hardware design complexity. The predetermined parameter $\alpha$ is not however limited to 0.5. From FIG. 3, it can be seen that the sampling error corresponding to $\mu_k$, which is generated from the timing control module 108, is equal to $1-\mu_k$. The detailed discussion of each element in the interpolator 104 is described in the following.

The delay modules 210 and 212 generate the sampling values $S_D[m_k-1]$ and $S_D[m_k-2]$ respectively through a sequential delay process according to the sampling value $S_D[m_k]$. It can be seen from formula (1) that the sampling value $S_D[m_k-2]$ output from the delay module 212 is a zero order sampling value. The constant scale module 202 multiplies the sampling value $S_D[m_k]$ by a negative constant equal to −0.5. The delay modules 204, 206, and 208 then generate the plurality of sampling values $-0.5*S_D[m_k-1]$, $-0.5*S_D[m_k-2]$, and $-0.5*S_D[m_k-3]$ respectively through the sequential delay process. The plurality of sampling values $-0.5*S_D[m_k]$, $-0.5*S_D[m_k-1]$, $-0.5*S_D[m_k-2]$, and $-0.5*S_D[m_k-3]$ are processed with the adders 214, 216, and 218, and the multipler 230 to generate a second order sampling value, which is output from the multipler 230. Similarly, the plurality of sampling values $-0.5*S_D[m_k]$, $-0.5*S_D[m_k-1]$, $-0.5*S_D[m_k-2]$, $-0.5*S_D[m_k-3]$, and $S_D[m_k-1]$ are processed with the adders 220, 222, and 224 to generate a first order sampling value, which is output from the adder 224. The first and second order sampling values are added together with the adders 226 and multiplied by the fractional interval $\mu_k$ by the multipler 232. Finally, the zero order sampling value, which is generated from the delay module 212, is added to the sum of the first and second order sampling values, generated from the multipler 232, to generate the interpolant S_INT[k].

Figure 4:
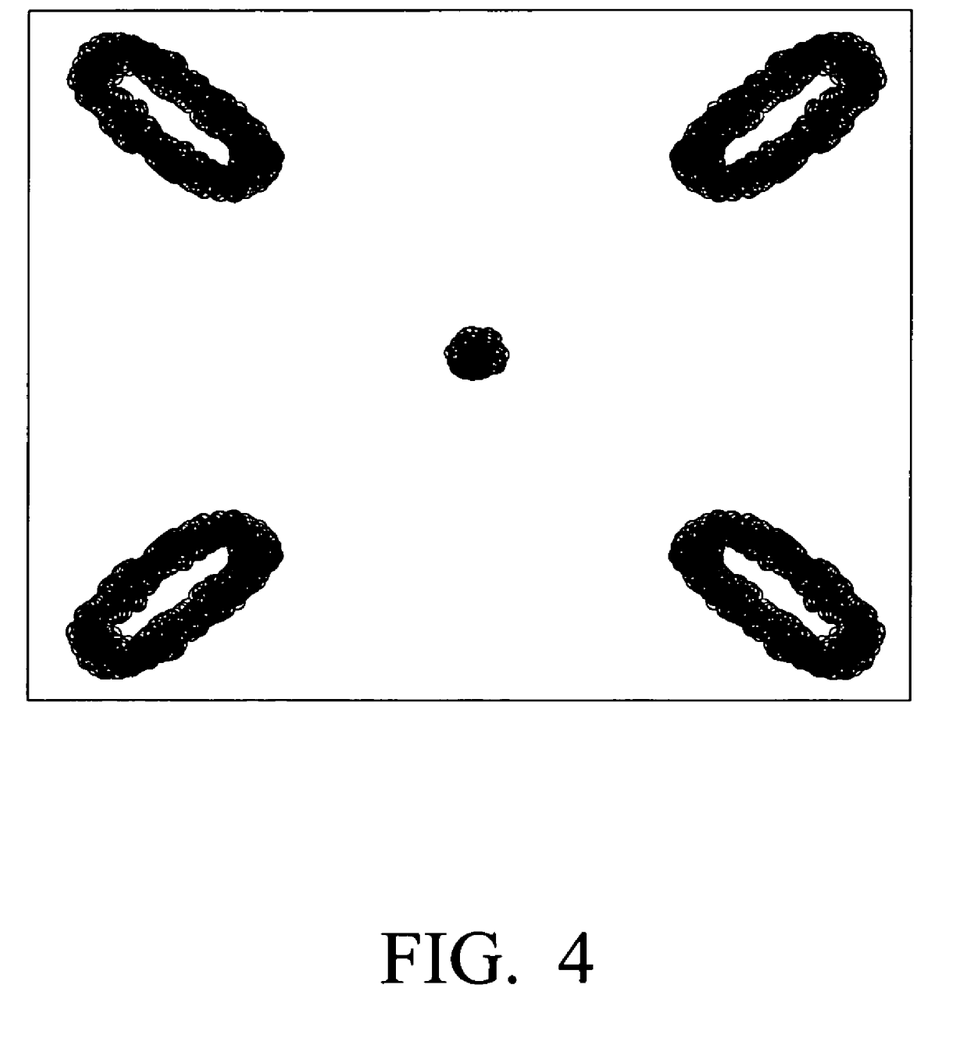
FIG. 4 is a constellation diagram of the related art digital output signal.

The related art interpolator 104 is commonly used for recovering timing in a timing recovery apparatus. Further detailed discussion of the related art interpolator can be found in Garder F. M., "Interpolation in Digital Modems—Part I: Fundamentals," *IEEE Trans. Commun.*, Vol. 41, No. 3, pp. 501-507, March 1993, and Erup L., Garder F. M., and Harris R. A., "Interpolation in digital modems—Part II : Implementation and Performance," *IEEE Trans. Commun.*, Vol 41, No. 6, pp. 998-1008, June 1993. However, in an N times sampling timing recovery ($T_s=T/N$, $T_s$ is a sampling period and T is an OFDM symbol period), the Error Vector Magnitude (EVM) is worst when $\mu_k$ is equal to 1/2N. Please refer to FIG. 4. FIG. 4 is a constellation diagram of the digital output signal S_OUT wherein $\mu_k$ is equal to 0.125 and a sampling rate is equal to 4. When $\mu_k$ is equal to 1/2N, the constellation diagram (QPSK or QAM) has a wide spread, and hence decreases performance.

SUMMARY

An object of the invention is to provide an interpolation module capable of recovering timing in an Orthogonal Frequency Division Multiplexing receiver comprising: a first symbol inverse unit for shifting phase of a digital input signal by 180 degrees to generate a first inverted signal that comprises a plurality of sampling values; an interpolator coupled to the first symbol inverse unit for interpolating the plurality of sampling values according to a fractional interval to generate an interpolated signal, which comprises a plurality of interpolants; and a second symbol inverse unit coupled to the interpolator for shifting phase of the interpolated signal by 180 degrees to output a second inverted signal.

Another object of the invention is to provide an interpolation method capable of recovering timing in an Orthogonal Frequency Division Multiplexing (OFDM) receiver comprising: shifting phase of a digital input signal by 180 degrees to generate a first inverted signal that comprises a plurality of sampling values; interpolating the plurality of sampling values according to a fractional interval to generate an interpolated signal, which comprises a plurality of interpolants; and shifting phase of the interpolated signal by 180 degrees to output a second inverted signal.

A further object of the invention is to provide an interpolator capable of recovering timing in an Orthogonal Frequency Division Multiplexing (OFDM) receiver comprising: a piecewise-parabolic interpolator for interpolating a digital input signal to generate an interpolated signal comprising a plurality of interpolants, wherein one interpolant is shown below:

$$y[k]=x[m_k+2](\alpha\mu_k-\alpha\mu^2_k)+x[m_k+1](-(\alpha+1)\mu_k+\alpha\mu^2_k)+x[m_k](1+\alpha\mu+\alpha\mu^2_k)+x[m_k-1](\alpha\mu_k-\alpha\mu^2_k).$$

k is a sample time, $\alpha$ is a predetermined positive fractional value, $\mu_k$ is a fraction interval corresponding to the sample time k, and $m_k$ is another sample time corresponding to the sample time k, y is the interpolated signal, x is the digital input signal.

Yet another object is to provide an interpolation method capable of recovering timing in an Orthogonal Frequency Division Multiplexing (OFDM) receiver comprising: interpolating a digital input signal to output an interpolated signal that comprises a plurality of interpolants, wherein one interpolant is shown below:

$$y[k]=x[m_k+2](\alpha\mu_k-\alpha\mu^2_k)+x[m_k+1](-(\alpha+1)\mu_k+\alpha\mu^2_k)+x[m_k](1+\alpha\mu+\alpha\mu^2_k)+x[m_k-1](\alpha\mu_k-\alpha\mu^2_k).$$

k is a sample time, $\alpha$ is a predetermined positive fractional value, $\mu_k$ is a fraction interval corresponding to the sample time k, and $m_k$ is another sample time corresponding to the sample time k, y is the interpolated signal, x is the digital input signal.

DESCRIPTION OF THE DRAWINGS

The invention can be more fully understood by reading the subsequent detailed description in conjunction with the examples and references made to the accompanying drawings, wherein.

DETAILED DESCRIPTION

Figure 5:
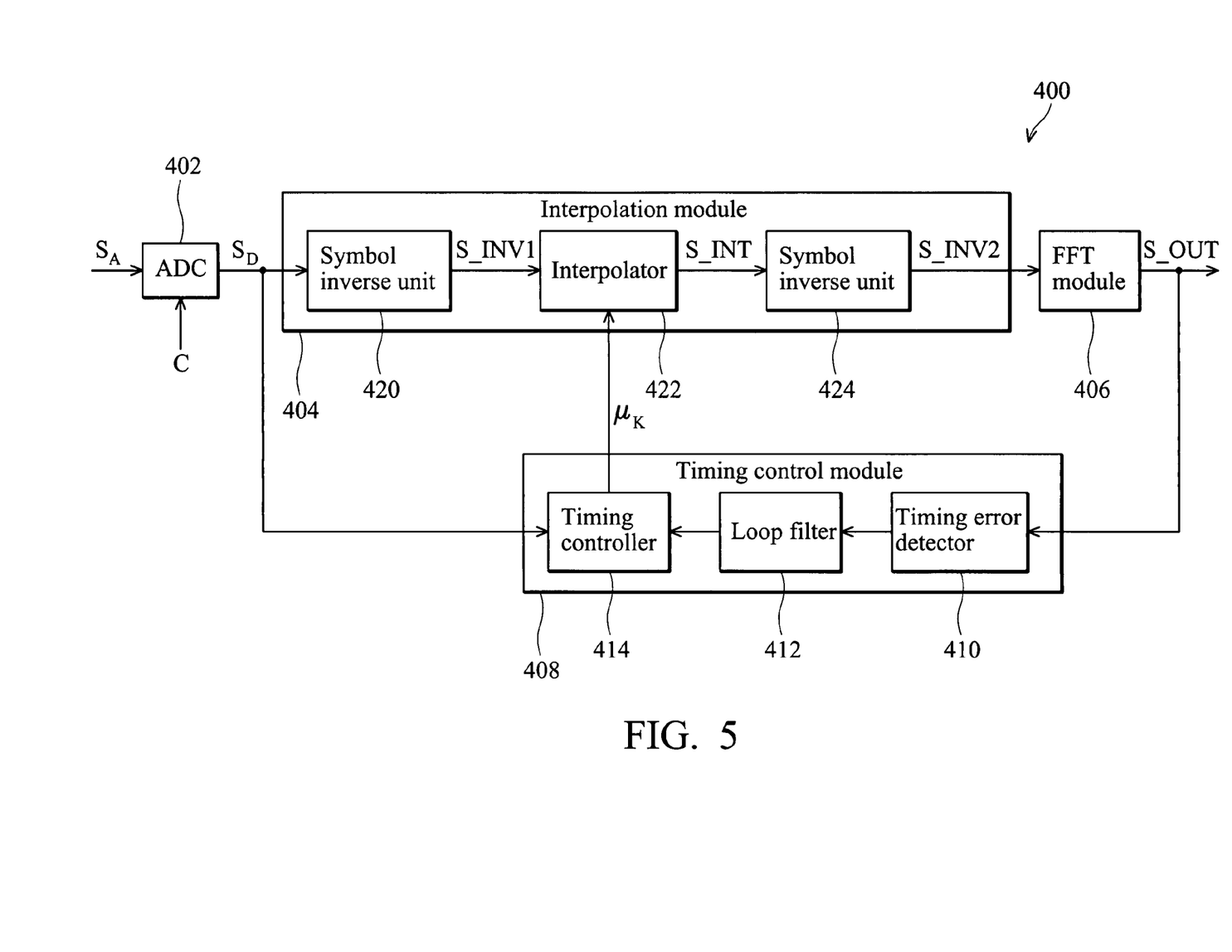
FIG. 5 shows a block diagram illustrating an interpolation module applied in a timing recovery apparatus according to an embodiment of the present invention.

A detailed description of the invention is provided in the following. Please refer to FIG. 5. FIG. 5 shows a block diagram illustrating an interpolation module 404 applied in a timing recovery apparatus 400 according to an embodiment of the invention. The timing recovery apparatus 400 comprises an analog-to-digital converter (ADC) 402, an interpolation module 404, a FFT module 406, and a timing control module 408. The ADC 402 utilizes a reference sampling clock c, which is fixed and can be generated from a local oscillator (e.g. a PLL), to convert an analog input signal $S_A$ to a digital input signal $S_D$ that comprises a plurality of sampling values. Because the operation of the ADC 402 is known to those skilled in the art, further discussion is omitted for the sake of brevity. The interpolation module 404 coupled to the ADC 402 interpolates the plurality of sampling values according to a fractional interval $\mu_k$, which represents the duration of a timing error corresponding to a sample time k, to generate a second inverted signal S_INV2. Further detailed discussion of the interpolation module 404 will be described later. The FFT module 406 coupled to the interpolation module 404 finally demodulates the inverted signal S_INV2 to output a digital output signal S_OUT. The timing control module 408 coupled to the FFT module 406, the ADC 402, and the interpolation module 404, generates the fractional interval $\mu_k$ for input into the interpolation module 404 according to the digital output signal S_OUT and the digital input signal $S_D$. The timing control module 408 comprises a timing error detector 410, a loop filter 412, and a timing controller 414, acting like a related art digital phase locked loop (DPLL). Since these three elements are known to those skilled in the art, further discussion is omitted for the sake of brevity. The operation of the interpolation module 404 of the present invention is detailed as follows.

The interpolation module 404 comprises an interpolator 422, and symbol inverse units 420 and 424. The symbol inverse unit 420 shifts phase of the digital input signal $S_D$ by 180 degrees to generate a first inverted signal S_INV1 that comprises a plurality of sampling values. For example, the digital input signals a,b,c are rearranged to be signals c, b, a to attain a 180 degree phase shift. The interpolator 422 coupled to the symbol inverse unit 420 then interpolates the plurality of sampling values according to the fractional interval $\mu_k$ to output an interpolated signal S_INT. The detailed discussion of the interpolator 412 is described later. Finally, the symbol inverse unit 424 coupled to the interpolator 422 shifts phase of the interpolated signal S_INT by 180 degrees to generate the second inverted signal S_INV2.

Figure 6:
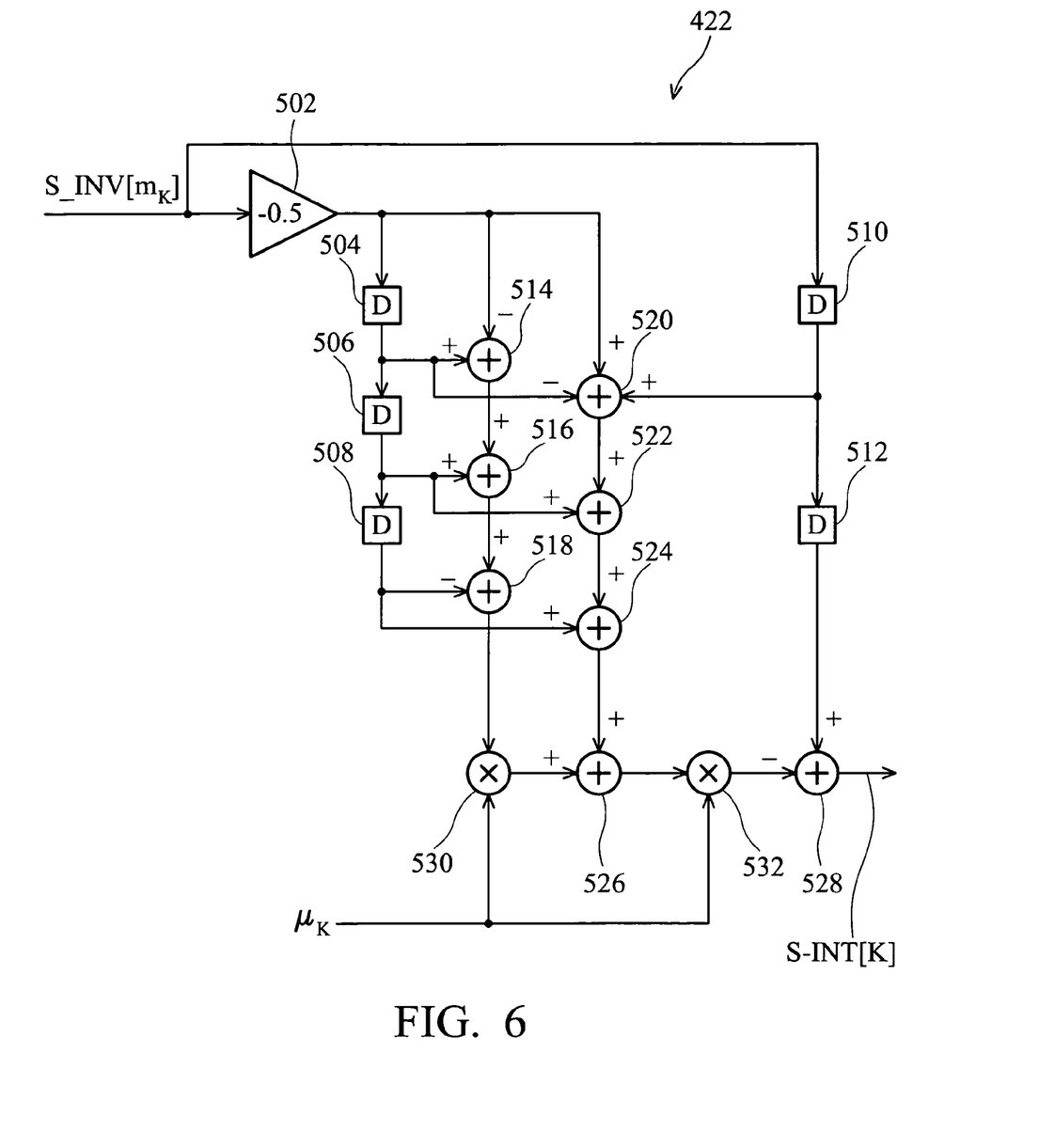
FIG. 6 shows a circuit diagram illustrating the interpolator shown in FIG. 5.

Please refer to FIG. 6. FIG. 6 shows a circuit diagram illustrating the interpolator 422 shown in FIG. 5. The interpolator 422 is also a piecewise-parabolic interpolator comprising delay modules 504, 506, 508, 510 and 512, a constant scale module 502, adders 514, 516, 518, 520, 522, 524, 526 and 528, and multipliers 530 and 532. The structure of the present invention interpolator 422 is similar to the related art interpolator 104. The key difference is the operation of the last adders 228 and 528. The adder 228 of the related art interpolator 104 performs addition of the zero order sampling value and the summation of the first and second order sampling values, but the adder 528 of the interpolator 422 performs subtraction of the zero order sampling value and the summation of the first and second order sampling values. A detailed description of the interpolator 422 of the invention is described in the following.

The interpolator 422 interpolates the plurality of sampling values according to the fractional interval $\mu_k$ to generate the interpolated signal S_INT. The interpolated signal S_INT comprises a plurality of interpolants. One interpolant is shown below:

$$S\_INT[k]=S\_INV1[m_k+2](\alpha\mu_k-\alpha\mu^2_k)+S\_INV1[m_k+1](-(\alpha+1)\mu_k+\alpha\mu^2_k)+S\_INV1[m_k](1+\alpha\mu_k+\alpha\mu^2_k)+S\_INV1[m_k-1](\alpha\mu_k-\alpha\mu^2_k)$$

Formula (2)

$\alpha$ is a predetermined parameter equal to 0.5, k is a sample time, and $m_k$ is another sample time corresponding to the sample time k. The predetermined parameter $\alpha$ equal to 0.5 simplifies the multiplication and reduces hardware design complexity. However, $\alpha$ set to 0.5 is only meant to serve as an example, and is not meant to be taken as a limitation. The detailed discussion of each element in the interpolator 422 is described in the following.

The delay modules 510 and 512 generate the sampling values S_INV1 [$m_k$-1] and S_INV1 [$m_k$-2] respectively through a sequential delay process according to the sampling value S_INV1 [$m_k$]. It can be seen obviously from formula (2) that the sampling value S_INV1 [$m_k$-2] output from the delay module 512 is a zero order sampling value. The constant scale module 502 multiplies the sampling value S_INV1 [$m_k$] by a negative constant equal to –0.5. The delay modules 504, 506, and 508 then generate the plurality of sampling values –0.5*S_INV1 [$m_k$-1], –0.5*S_INV1 [$m_k$-2], and –0.5*S_INV1 [$m_k$-3] respectively through the sequential delay process. The plurality of sampling values –0.5*S_INV1 [$m_k$], –0.5*S_INV1 [$m_k$-1], –0.5*S_INV1 [$m_k$-2], and –0.5*S_INV1 [$m_k$-3] are processed by adders 514, 516, and 518, and the multipler 530 to generate a second order sampling value, which is output from the multipler 530. Similarly, the plurality of sampling values –0.5*S_INV1 [$m_k$], –0.5*S_INV1 [$m_k$-1], –0.5*S_INV1 [$m_k$-2], –0.5*S_INV1 [$m_k$-3], and S_INV1 [$m_k$-1] are processed with the adders 520, 522, and 524 to generate a first order sampling value, which is output from the adder 524. The first and second order sampling values are added by the adder 526 and multiplied by the fractional interval $\mu_k$ by the multipler 532. Finally, the zero order sampling value, which is generated from the delay module 512, is added to the minus sum of the first and second order sampling values, which is generated from the multipler 532, to generate the interpolant S_INT [k].

Figure 7:
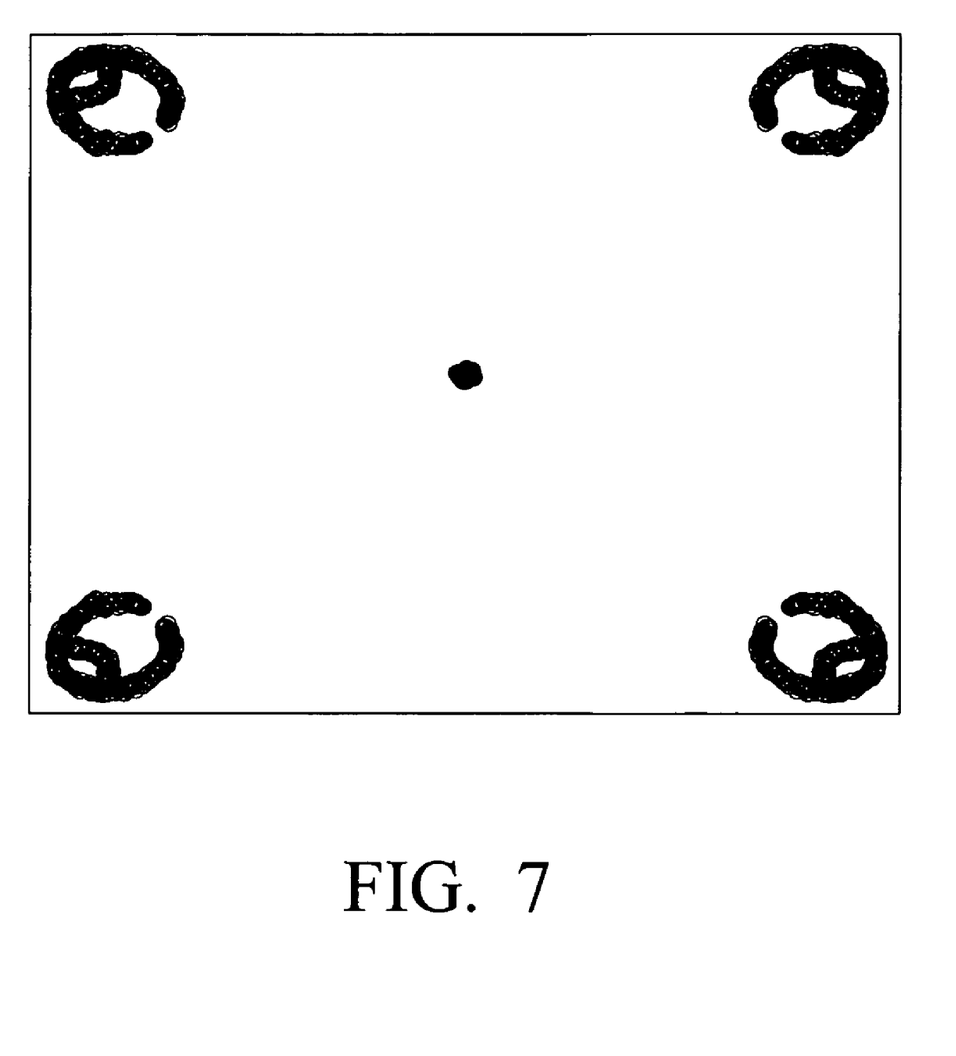
FIG. 7 is a constellation diagram of the interpolator of the invention.

In an N times sampling timing recovery ($T_s$=T/N, $T_s$ is a sampling period and T is an OFDM symbol period), the Error Vector Magnitude (EVM) is worst when $\mu_k$ is equal to 1/N, which is twice as large as the related art interpolator. Please refer to FIG. 7. FIG. 7 is a constellation diagram of the interpolator of the invention wherein $\mu_k$ is equal to 0.25 and a sampling rate is equal to 4. The constellation diagram (QPSK or QAM) has a narrower spread than the related art interpolator. It is obvious that performance of the inventive interpolator is better than that of the related art interpolator when signal to noise ratio (SNR) is larger than a predetermined value.

While the invention has been described by way of example and in terms of the preferred embodiment, it is to be understood that the invention is not limited thereto. To the contrary, it is intended to cover various modifications and similar arrangements (as would be apparent to those skilled in the art) Therefore, the scope of the appended claims should be accorded the broadest interpretation so as to encompass all such modifications and similar arrangements.

What is claimed is:

1. An interpolation module capable of recovering timing in a timing recovery apparatus comprising:
    a first symbol inverse unit for shifting phase of a digital input signal by 180 degrees to generate a first inverted signal that comprises a plurality of sampling values;
    an interpolator coupled to the first symbol inverse unit for interpolating the plurality of sampling values according to a fractional interval to generate an interpolated signal, which comprises a plurality of interpolants, wherein the fractional interval is output to the interpolator according to the digital input signal; and
    a second symbol inverse unit coupled to the interpolator for shifting phase of the interpolated signal by 180 degrees to output a second inverted signal;
    wherein the interpolator is a piecewise-parabolic interpolator outputting the plurality of interpolants, one interpolant is shown below:

$$y[k]=x[m_k+2](\alpha\mu_k-\alpha\mu^2_k)+x[m_k+1](-(\alpha+1)\mu_k+\alpha\mu^2_k)+x[m_k](1+\alpha\mu_k+\alpha\mu^2_k)+x[m_k-1](\alpha\mu_k-\alpha\mu^2_k)$$

wherein k is a sample time, $\alpha$ is a predetermined positive fractional value, $\mu_k$ is the fraction interval corresponding to the sample time k, and $m_k$ is another sample time corresponding to the sample time k, y is the interpolated signal, x is the digital input signal.

2. The interpolation module according to claim 1, wherein the predetermined positive fractional value is 0.5.

3. An interpolation method capable of recovering timing in a timing recovery apparatus comprising:
    shifting phase of a digital input signal by 180 degrees to generate a first inverted signal that comprises a plurality of sampling values;
    interpolating the plurality of sampling values according to a fractional interval to generate an interpolated signal, which comprises a plurality of interpolants;
    shifting phase of the interpolated signal by 180 degrees to output a second inverted signal;
    utilizing a reference sampling clock to convert an analog input signal to the digital input signal; and
    outputting the fractional interval to perform interpolation according to the digital input signal and the second inverted signal;
    wherein one interpolate of the interpolated signal is shown below:

$$y[k]=x[m_k+2](\alpha\mu_k-\alpha\mu^2_k)+x[m_k+1](-(\alpha+1)\mu_k+\alpha\mu^2_k)+x[m_k](1+\alpha\mu_k+\alpha\mu^2_k)+x[m_k-1](\alpha\mu_k-\alpha\mu^2_k)$$

wherein k is a sample time, $\alpha$ is a predetermined positive fractional value, $\mu_k$ is the fraction interval corresponding to the sample time k, and $m_k$ is another sample time corresponding to the sample time k, y is the interpolated signal, x is the digital input signal.

4. The interpolation method according to claim 3, wherein the predetermined positive fractional value is 0.5.

5. A system comprising:
    a first symbol inverse unit for shifting phase of a digital input signal by 180degrees to generate a first inverted signal that comprises a plurality of sampling values;
    an interpolator coupled to the first symbol inverse unit for interpolating the plurality of sampling values according to a fractional interval to generate an interpolated signal, which comprises a plurality of interpolants;
    a second symbol inverse unit coupled to the interpolator for shifting phase of the interpolated signal by 180 degrees to output a second inverted signal;
    an analog-to-digital converter (ADC) coupled to the first symbol inverse unit for utilizing a reference sampling clock to convert an analog input signal to the digital input signal;

a timing control module coupled to the second symbol inverse unit, the ADC, and the interpolator, for outputting the fractional interval to the interpolator according to the digital input signal and the second inverted signal; and an FFT module coupled to the second symbol inverse unit and the timing control module for demodulating the second inverted signal to generate a demodulated digital output signal to be sent to the timing control module;

wherein the interpolator is a piecewise-parabolic interpolator outputting the plurality of interpolates, one interpolate is shown below:

$$y[k]=x[m_k+2](\alpha\mu_k-\alpha\mu^2_k)+x[m_k+1](-(\alpha+1)\mu_k+\alpha\mu^2_k)+x[m_k](1+\alpha\mu_k+\alpha\mu^2_k)+x[m_k-1](\alpha\mu_k-\alpha\mu^2_k)$$

wherein k is a sample time, $\alpha$ is a predetermined positive fractional value, $\mu_k$ is the fraction interval corresponding to the sample time k, and $m_k$ is another sample time corresponding to the sample time k, y is the interpolated signal, x is the digital input signal.

6. The system according to claim 5, wherein the predetermined positive fractional value is 0.5.

* * * * *